Oct. 7, 1958 — W. J. MOREAU — 2,854,695
CATHETER MOLDING FORM
Filed June 13, 1956 — 2 Sheets-Sheet 2

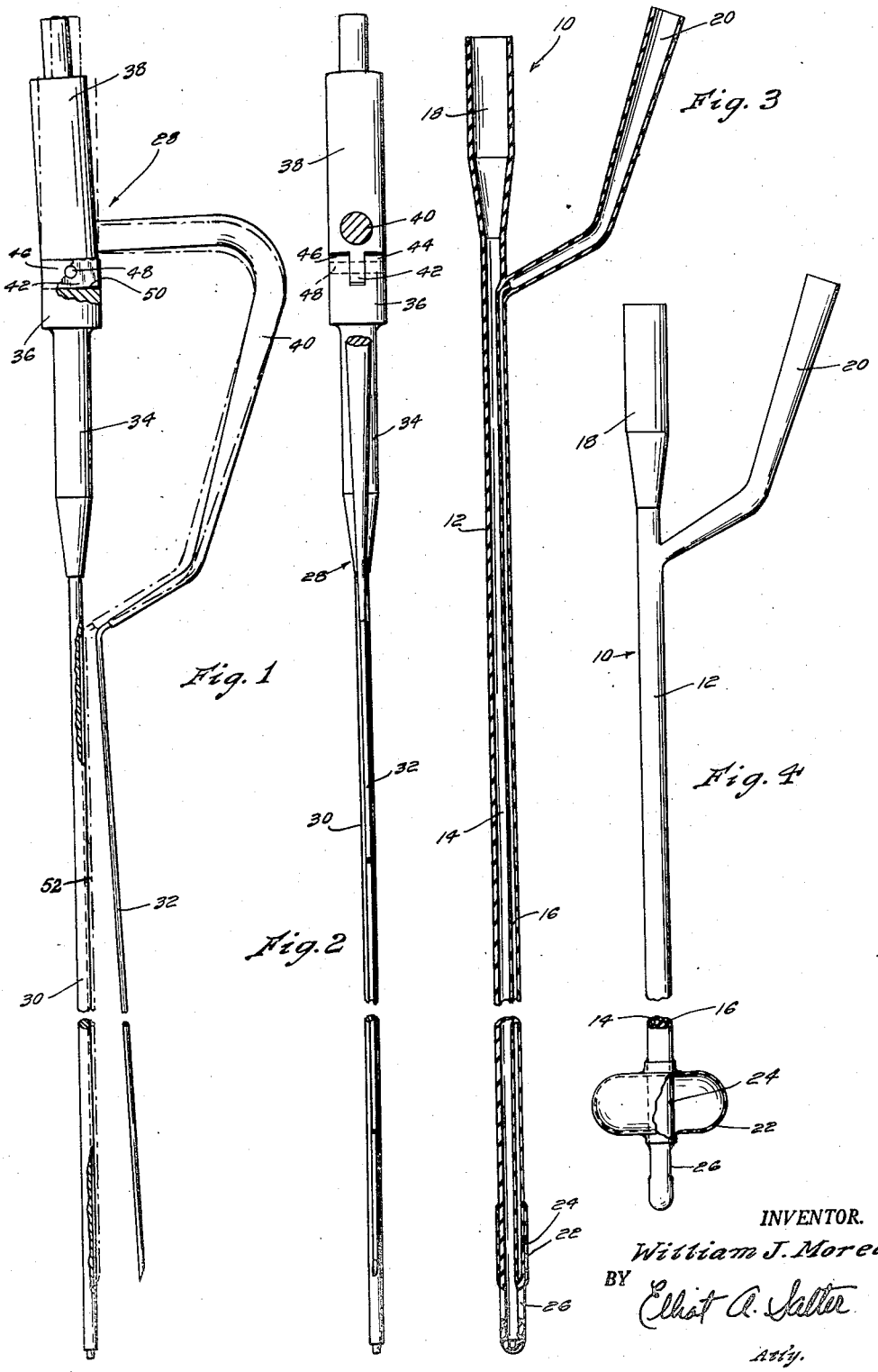

INVENTOR.
William J. Moreau
BY Elliot A. Salter
Atty.

United States Patent Office 2,854,695
Patented Oct. 7, 1958

2,854,695

CATHETER MOLDING FORM

William J. Moreau, Pawtucket, R. I., assignor to Davol Rubber Company, a corporation of Rhode Island Application June 13, 1956, Serial No. 591,089

5 Claims. (Cl. 18—41)

The present invention relates generally to a molding form, and more particularly to a novel dip rod assembly for use in the manufacture of surgical rubber articles such as catheters.

A primary object of the instant invention is the provision of a molding form that will greatly facilitate and expedite the manufacture of catheters made by a succession of latex dips, and which will additionally contribute toward a higher quality finished product.

Another object of the instant invention is the provision of a novel dip rod assembly for use in connection with the manufacture of latex dipped catheters, which rod is less susceptible to breakage, hence resulting in reduced material costs.

A further object is the provision of a catheter molding form which is faster and easier to operate, thus reducing labor costs.

Still another object is the provision of a catheter molding form that is sturdy and durable of construction although inexpensive to manufacture.

Other objects, features and advantages of the invention will become apparent as the description thereof proceeds when considered in connection with the accompanying illustrative drawings.

In the drawings which illustrate the best mode presently contemplated by me for carrying out my invention:

Fig. 1 is a side elevation of a catheter molding form constructed in accordance with the instant invention;

Fig. 2 is an edge view thereof;

Fig. 3 is a sectional elevation of a completed catheter;

Fig. 4 is a side elevation of a catheter with the bulb thereof distended, a portion of the bulb being broken away for purposes of clarity;

Figure 5:
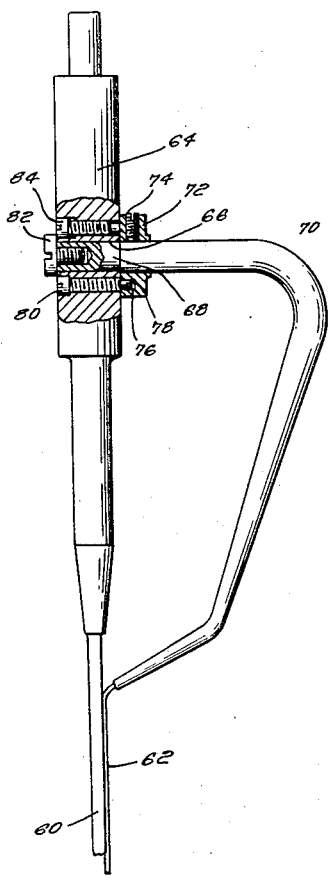
Fig. 5 is a fragmentary side elevation, partly in section, showing a modified molding form.

It has been found desirable to provide means for facilitating the manufacture of rubber articles, and particularly articles of the type intended for medical and surgical use, such as catheters or the like. Articles of this type generally comprise an elongated tubular body formation having a pair of spaced longitudinally extending bores therein. One of the bores, generally the larger in diameter of the two, functions as a drainage lumen, while the other of said bores is in communication with an inflatable bulb and hence functions as an inflating lumen.

In the manufacture of items of this type, it has heretofore been the practice to utilize a succession of latex dips substantially in accordance with the procedure set forth in United States Patent No. 2,320,157. More specifically, a bifurcated metallic dip form having a pair of elongated rods is generally utilized, the rods being separated before the first latex dip and then being positioned in longitudinal engagement with each other for a subsequent latex dip. The prior art dip forms, generally constructed of stainless steel, or in some cases aluminum, have proven to be somewht deficient due to the fact that it has been necessary to force or spring the elongated rods apart to achieve the desired spaced relation and then to force them back together to achieve the desired engagement for the subsequent dip. As will be obvious, the constant bending of the rods results in premature breakage and additionally has proven difficult and cumbersome for the operator thereby resulting in loss of time and hence increased labor and expense. The invention hereinafter to be described is directed to the provision of a novel and improved dip form wherein the elongated rods may be readily and simply moved apart when desired and subsequently moved back together.

Referring now to the drawings, and more particularly to Figs. 3 and 4 thereof, there is shown a catheter of the type manufactured by the method and apparatus discussed supra. More specifically, the catheter 10 comprises an elongated body portion 12 having a pair of longitudinal passages 14 and 16 extending therethrough. The bore 14 functions as the drainage lumen of the catheter, while the bore 16 functions as the inflating lumen thereof. As will be obvious, the bores 14 and 16 communicate with enlarged, funnel-like portions 18 and 20, respectively. Adjacent to but spaced from the opposite extremity of the catheter there is provided an inflatable bulb 22, the interior of which is in communication with inflating lumen 16 by means of an aperture 24 formed in the wall of the catheter. Thus bulb 22 may be inflated, as indicated in Fig. 4, by forcing air or other fluid under pressure through the lumen 16. An eye 26 is formed at the distal end of the catheter and is located intermediate said end and the bulb 22, the eye communicating with the drainage lumen 14.

Figure 9:
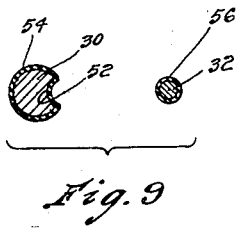
Figs. 9, 10 and 11 are figures showing the sequence of steps in the manufacture of the catheter.

The catheter 10 above described is preferably manufactured by means of a series of latex dips, substantially in accordance with the procedure set forth in United States Patent No. 2,320,157. Thus there is provided a bifurcated molding or dip form generally indicated at 28, which form comprises a pair of elongated rods 30 and 32. As will be seen most clearly in Figs. 1 and 2, rod 30 depends from an enlarged shaft 34, which shaft has a bifurcated upper portion 36 for pivotally receiving an upper handle section 38. Fixedly secured to section 38 is an offset mounting portion 40, which carries at its lower extremity the aforedescribed rod 32. I prefer to effect the pivotal connection between upper handle section 38 and bifurcated upper portion 36 by providing the former with a downwardly depending lug 42 which fits snugly between the branches 44 and 46 of the portion 36. A rock shaft 48 extends through the parts to provide the pivot axis, it being noted that the lower surface of lug 42 is slightly beveled at its edges as at 50 so that a limited rocking motion between the parts may be accomplished. Thus when the upper handle section 38 is rotated about axis 48 in a counterclockwise direction, the parts achieve the full-line position of Fig. 1 wherein the rods 30 and 32 are in spaced relation. Conversely, when section 38 is rotated about axis 48 in a clockwise direction, the parts achieve the dotted-line position of Fig. 1 wherein the rods 30 and 32 are in longitudinal engagement with each other. As will be seen most clearly in Fig. 9, rod 30 may be grooved as at 52 whereby to snugly receive rod 32 when the rods have been pivoted into engagement with each other. More specifically, groove 52 extends longitudinally of rod 30 and is disposed in the portion of the surface thereof most closely adjacent to the rod 32. As will be noted, the configuration of the groove, in cross section, closely conforms to the outer curvature of rod 32 whereby the latter is adapted to be partially received therein in the manner indicated.

Figure 10:
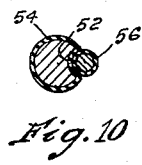
Figure 11:
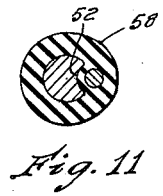

In operation and use, my form 28 is initially set at the full-line position of Fig. 1 wherein rods 30 and 32 are in spaced relation to each other. The form is then dipped a predetermined number of times in latex, which may be vulcanized or unvulcanized, to obtain coats 54 and 56 over rods 30 and 32, respectively. When the latex has dried long enough to acquire a tacky texture, rods 30 and 32 are then pivoted into longitudinal engagement with each other, note Fig. 10 and the dotted-line position of parts in Fig. 1. The form is then again dipped into latex whereby a thick coat 58 is formed, the form and coat at this stage of manufacture having the appearance shown in Fig. 11. After suitable drying and curing, the form 28 is withdrawn, aperture 24 and eye 26 are formed, and the bulb 22 is then cemented or otherwise secured in proper position.

It will be understood that the basic concept of the instant invention is the provision of a dip form 28 having means for readily enabling the rods 30 and 32 to be pivoted into spaced relation and then subsequently to be pivoted back into longitudinal engagement with each other. Heretofore, it was necessary to bend and force apart the rods 30 and 32 in order to effect the desired spaced relation and then to subsequently force them back together again before the final dip. Since these forms are of metallic construction, usually stainless steel, it will be obvious that the constant bending of the rods will result in premature breakage, thereby resulting in increased material and manufacturing costs. Furthermore, when utilizing the prior art dip forms, it has often proved difficult to maintain the desired longitudinal engagement of the coated rods when making the final dip, and in some cases it has even proved necessary to hold them together such as by thin spaced latex bands or the like. As will be apparent, the instant invention overcomes all these disadvantages and enables a higher quality product to be manufactured more quickly and at a reduced cost.

Figures 6, 7:
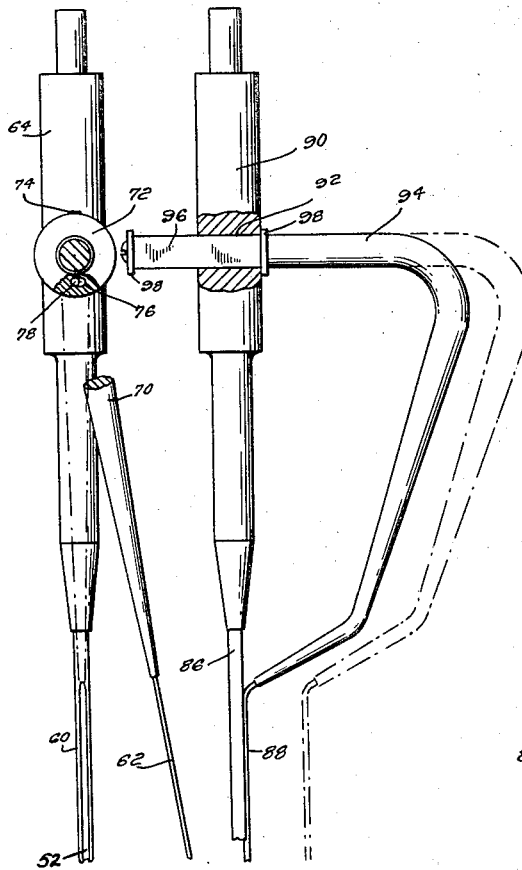
Fig. 6 is an edge view of the form of Fig. 5, a portion having been broken away for purposes of clarity.
Fig. 7 is a fragmentary side elevation, partly broken away, of still another modification.

In Figs. 5 and 6 there is illustrated a slightly modified form of my invention wherein the elongated rods 60 and 62 are movably mounted with respect to each other in a slightly different manner. More specifically, the upper handle section 64 of rod 60 is provided with an aperture 66 for pivotally receiving a reduced portion 68 of offset mounting section 70. A collar 72 is secured to the member 70 adjacent upper handle section 64 by means of a set screw 74 or the like. The inner surface of the collar 72 is provided with an arcuate groove 76 which receives the reduced end 78 of screw 80 for limiting the relative rotation of the parts in a manner thought to be obvious. The member 70 may be maintained in position by a screw 82 and an additional screw 84 may be provided to effect a frictional drag on collar 72 during relative rotation of the parts. It will be understood that in operation and use this form of my invention functions in an identical fashion to that of my aforedescribed preferred embodiment of Figs. 1 and 2, the only distinction residing in the specific structural details in the pivotal mounting of the parts.

Figure 8:
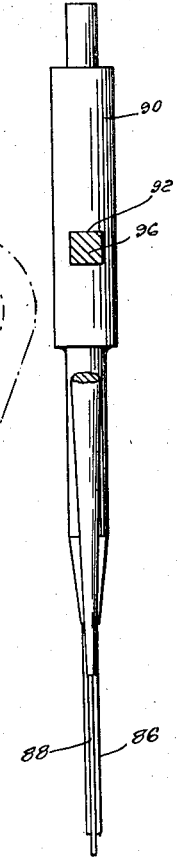
Fig. 8 is an edge view of the form of Fig. 7, a portion thereof broken away for purposes of clarity.

In Figs. 7 and 8 there is shown still another modification wherein rods 86 and 88 are movably mounted with respect to each other by means of a sliding connection as opposed to the aforedescribed pivotal mountings. Thus, upper handle portion 90 of the rod 86 is provided with a square aperture 92. The offset mounting portion 94 is provided with a complementary square section 96 having stop flanges 98, it being understood that section 96 is slidably received within aperture 92, as clearly shown in Fig. 7, and is slidable therein within the limits of the flanges 98. Thus when the offset portion 94 is moved to the dotted-line position of Fig. 7, rods 86 and 88 are in spaced relation with respect to each other and are properly positioned for the initial dip. When it is subsequently desired to move the rods 86 and 88 back into engagement with each other prior to making the final dip, portion 94 is slid inwardly until the parts attain the full-line position of Fig. 7.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A molding form for use in the manufacture of catheters or the like made by a succession of latex dips, said form comprising a first rod for forming the catheter drainage lumen, a second rod for forming the catheter inflating lumen, and means carried by said form for connecting said rods, while at the same time allowing relative movement therebetween, whereby said rods are movable from a first position wherein they are in longitudinal engagement with each other to a second position wherein they are in spaced relation.

2. The molding form of claim 1 further characterized in that said first rod is of larger diameter than said second rod and is provided with a longitudinally extending groove for receiving the latter when the rods are in said first position.

3. The molding form of claim 1 further characterized in that said connecting means comprises a pivotal connection.

4. The molding form of claim 1 further characterized in that said connecting means comprises a sliding connection.

5. In the molding form of claim 1, means associated therewith for positively limiting relative movement of said rods.

References Cited in the file of this patent

UNITED STATES PATENTS

| | | |
|---|---|---|
| 2,043,630 | Raiche | June 9, 1936 |
| 2,053,357 | Winder | Sept. 8, 1936 |
| 2,230,151 | Winder | Jan. 28, 1941 |